United States Patent [19]
Rondeau et al.

[11] 3,760,143
[45] Sept. 18, 1973

[54] WELDING STUD

[75] Inventors: Herbert F. Rondeau, Winchester, Mass.; Donald H. Ettinger, Royal Oak, Mich.

[73] Assignee: Warren Fastener Corporation, Mount Clemens, Mich.

[22] Filed: Jan. 3, 1972

[21] Appl. No.: 214,926

[52] U.S. Cl................... 219/98, 29/191.2, 219/99, 219/146
[51] Int. Cl........................ B23k 9/20, B23k 35/22
[58] Field of Search...................... 219/98, 99, 146; 29/183.5, 191.2, 197; 117/46; 204/41

[56] References Cited
UNITED STATES PATENTS

| | | |
|---|---|---|
| 2,429,175 | 10/1947 | van der Willigen et al. .... 219/146 X |
| 2,612,394 | 9/1952 | Nelson .............................. 219/99 X |
| 2,888,740 | 6/1959 | Danis ................................. 29/191.2 |
| 3,031,330 | 4/1962 | Hornick et al. ..................... 117/46 |
| 3,152,971 | 10/1964 | Tomaszewski et al............... 204/41 |
| 3,254,970 | 6/1966 | Dittrich et al. .................... 29/183.5 |
| 3,322,515 | 5/1967 | Dittrich et al. ................... 29/191.2 |
| 3,094,607 | 6/1963 | Flynn et al........................... 219/99 |

*Primary Examiner*—R. F. Staubly
*Attorney*—Richard B. Megley et al.

[57] ABSTRACT

A weldable stud, especially one of high carbon steel to be drawn-arc welded to high or low carbon substrates (or vice versa), desirably includes a fluxing combination consisting essentially of nickel and aluminum. The conical end of the stud to be welded preferably has a hole in its tip for receiving a flux assembly wherein the nickel and aluminum respectively are present roughly on the order of about 30 to 70 percent by weight in novel and alternative forms for engendering austenitic joints. Resultant alloying at the fusion zone of the stud and substrate interfaces provides improved weld strength.

The different flux assemblies may have substantially the same outer diameter and, accordingly, one mechanism is employed for practicing a novel method of successively producing and mounting the different assemblies in studs or the like.

6 Claims, 13 Drawing Figures

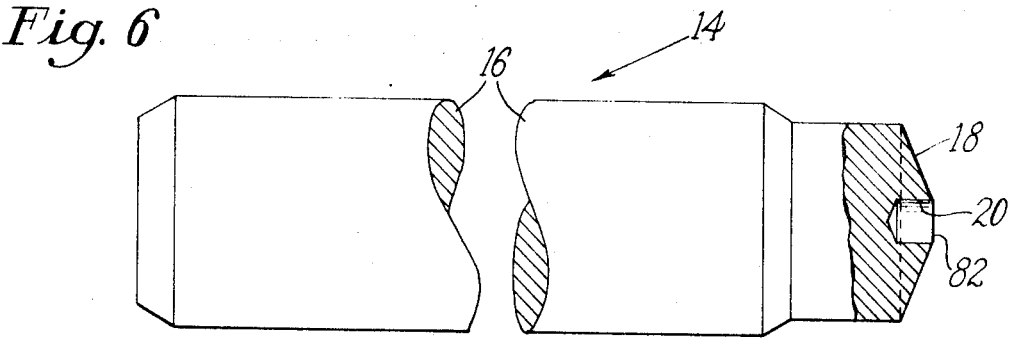
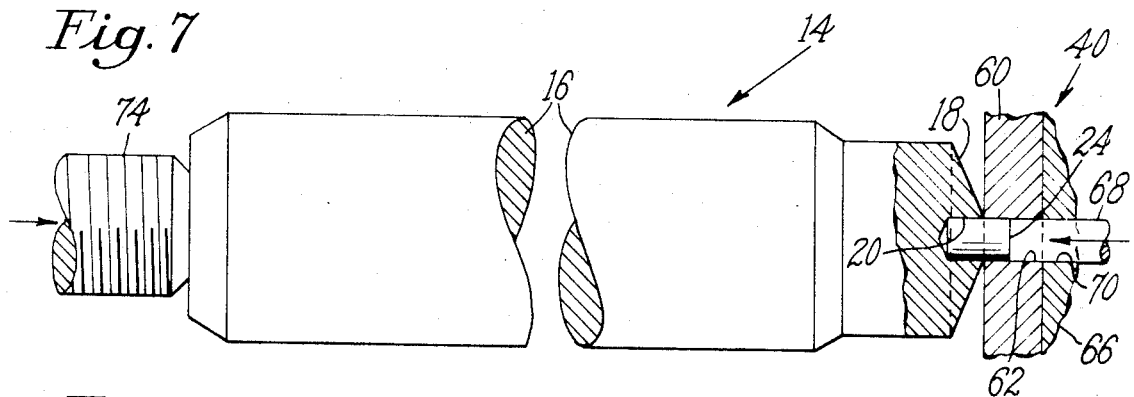
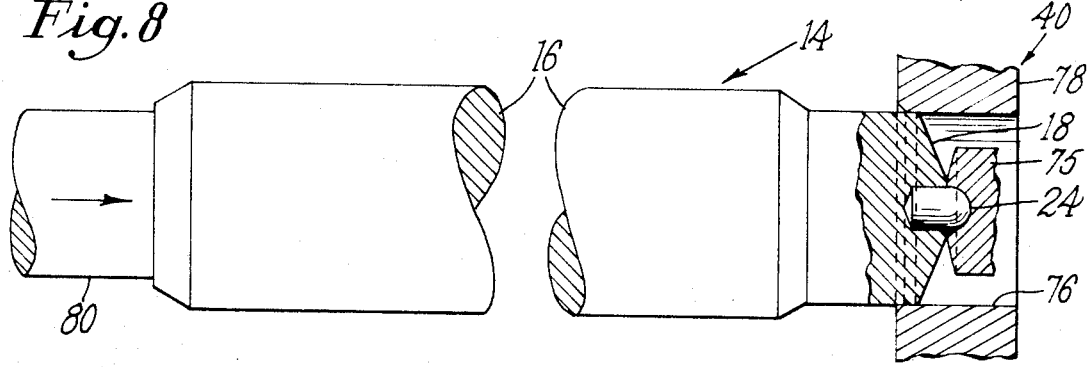
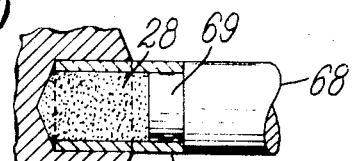
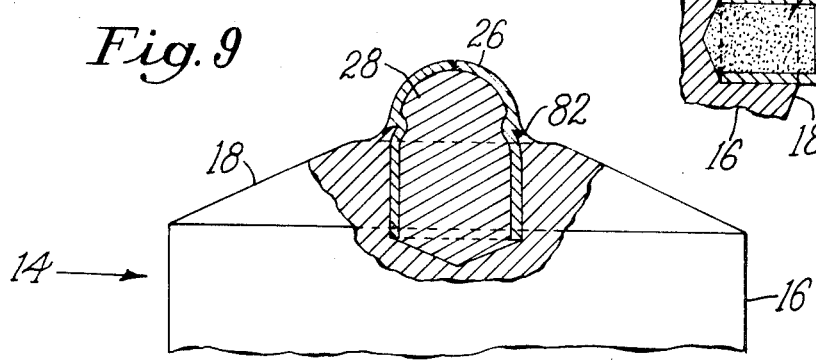

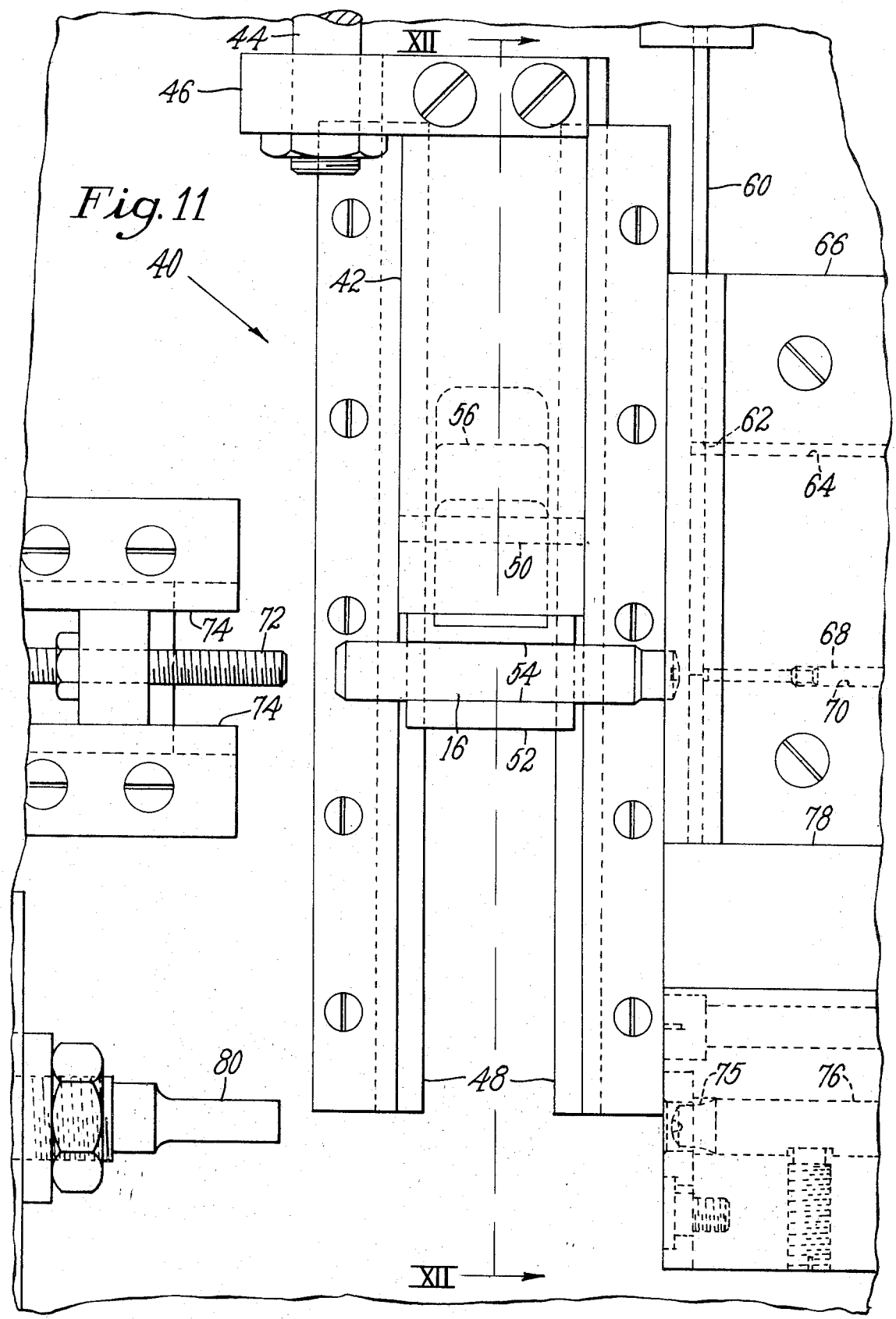

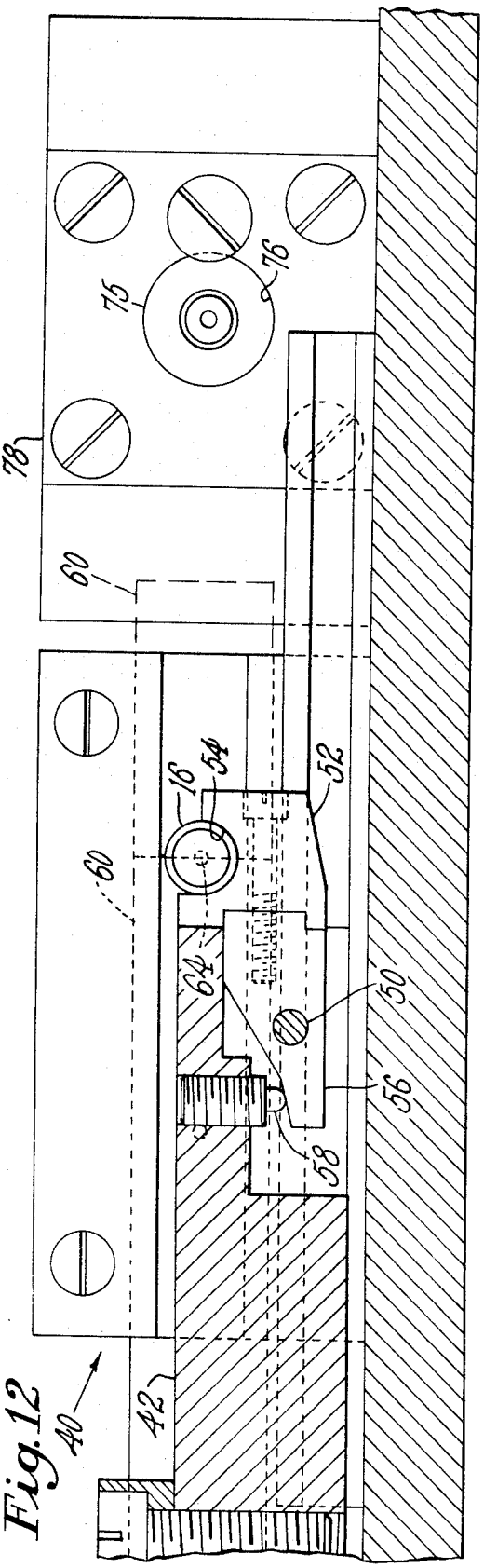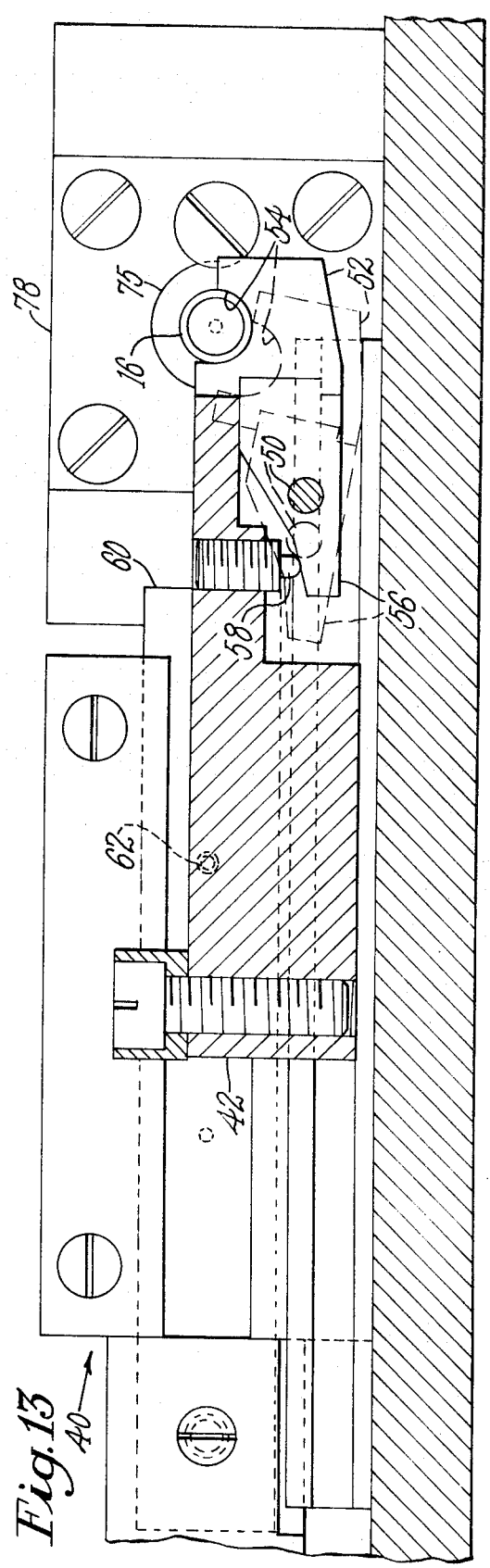

3,760,143

WELDING STUD

BACKGROUND OF THE INVENTION

Considerable need exists for creating better, i.e., stronger weldments between studs of high carbon content (above 0.2 percent) and high or low carbon substrates, or vice versa. While it is generally understood that increasing carbon content of steel, iron, or cast iron yields greater hardness, actual hardness reflecting brittleness, toughness and ductility, however measured, is dependent as well on the metalurgical phase or phases in which the carbon is present. A drawn-arc weld comprises a fusion zone, and so called adjacent "heat affected" zones in both the stud and the substrate receiving it. It is recognized that the form of the carbon in the fusion zone as the molten interfaces pass from liquid to molten state may be determined as austenitic and martensite phases, and that it is desirable to avoid the latter and retain the former as room temperatures and lower transition temperatures are reached. As herein disclosed one approach to retention of the austenitic or less brittle phase is to introduce nickel into the fusion zone. The present invention advantageously provides fluxing combinations, in alternative forms, of nickel and aluminum securable to weldable stud ends. While studs have hitherto employed aluminum, tinanium, calcium fluoride, and various other fluxing materials, sometimes as washers or coating s imposed on the stud and occasionally as received fillers therein, this invention provides a more effective austenitic favoring fluxing material assuring improved quality or strength of the weld.

SUMMARY OF THE INVENTION

In view of the foregoing a main object of this invention is to provide an improved low-carbon steel welding stud carrying an austenitic favoring fluxing material comprised of nickel for attaining increased strength in the fusion zone when arc welding the stud to high-carbon steel. It will be understood that the same objective applies, visa-vis high carbon studs and low carbon substrates.

Another object of the invention is to provide a weldable steel member, for instance a stud or the like, protrusively carrying a combination nickel and aluminum fluxing assembly for decreasing the martensite forming ability of the fusion zone suring welding of the member.

A further object of this invention is to provide an improved method for assembling in the recessed ends of steel studs, alternative forms of a getter wire of nickel and aluminum in predetermined proportions.

To these ends, and in accordance with a feature of the invention, there is provided in one illustrative embodiment of steel stud having on its weldable end a protruding composite flux which consists essentially of about 80 percent aluminum to about 20 percent nickel by volume. Depending on variant factors, it will be understood that the proportional range of these metals may extend plus or minus 10 percent, i.e., from 20 percent nickel and 80 percent aluminum to 40 percent nickel and 60 percent aluminum, by weight. While retaining the indicated volume ratios (or about 30 percent nickel to about 70 percent aluminum by weight), each metal may have different formation. For example in one case the nickel may be external and the aluminum internal, or vice versa, a length of the getter wire being successively severed into slugs from composite lengths of uniform diameter and applied to respective stud ends in novel manner by mechanism locking the particular flux assembly into its stud.

BRIEF DESCRIPTION OF THE DRAWINGS

The foregoing and other objects of the invention, together with various novel features, will now be more particularly described in connection with an illustrative embodiment, and with reference to the accompanying drawings thereof, in which:

FIG. 6 is a side elevation of a stud body having its weldable end formed as by a punch to provide a receiving recess for fluxing material;

FIG. 7 is a view similar to FIG. 6 showing a next step wherein the stud receives a getter slug;

FIG. 8 is a view similar to FIGS. 6 and 7 and indicating a final assembly or coining step;

FIG. 9 is an enlarged view partly in section showing an installed getter slug or fluxing assembly of the type illustrated in FIG. 2;

FIG. 10 is a detail view showing a powder containing slug, the powder being depressed relative to an end of the slug to facilitate its closure;

FIG. 11 is a plan view of a portion of a machine for sequentially assembling, from the wire shown in FIG. 5, studs and nickel-aluminum fluxing assemblies as shown in FIG. 9, a stud being shown in initial loading position and a cutter bar being retracted;

FIG. 12 is a section taken on the line XII—XII of FIG. 10; and

FIG. 13 is a section corresponding to FIG. 12 but showing the inserted getter wire slug and stud advanced to the coining position and ready to be unloaded.

DESCRIPTION OF PREFERRED EMBODIMENT

Figure 1:
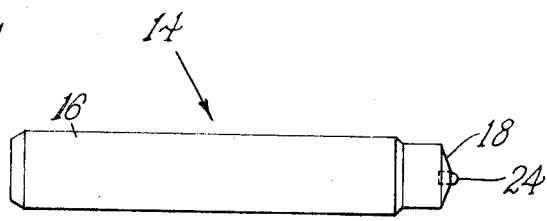
FIG. 1 is a side view of one form of weldable stud an end of which is fitted with an austenitic-favoring fluxing assembly formed, for example, from one of the alternative nickel and aluminum types herein disclosed.

Referring first to FIG. 1, it will be understood that a low or high carbon steel stud generally designated 14 in FIGS. 1, 6–9, and 11, may have a main body 16 of generally cylindrical shape, and a preferably conical, weldable end portion having a surface 18. The length of the stud body 16 and its diameter, which need not necessarily be uniform throughout, is selected according to the holding power required or other factors which may be involved. Assuming the stud 14 is to be drawn-arc welded to a structure (not shown) having a metal substrate whereby a fusion zone will be formed at the interface of the substrate and the surface 18, it is important to the strength and quality of the weld that the molten metal upon returning to room temperature and lower transitional temperatures retain austenitic rather than martensite character. To this end an austenitic-favoring fluxing material, in representative alternate forms, is provided for mounting in a central recess 20 (FIGS. 6–9) of the surface 18 as hereinafter explained. The depth of the recess 20 may be on the approximate order of 0.04 to 0.05 inches in a ½ inch diameter stud, for example.

Figure 2:
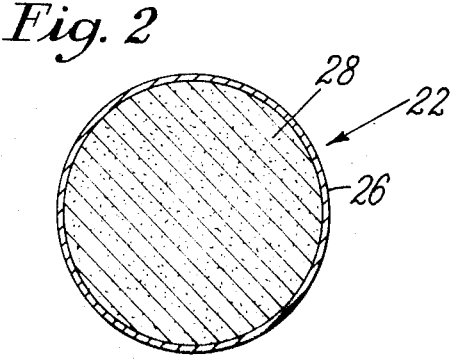
FIG. 2 is a magnified transverse section of one getter wire assembly wherein a length of aluminum tubular wire is compacted with a mixture of nickel and aluminum powder, or nickel plated aluminum powder particles.
Figure 5:
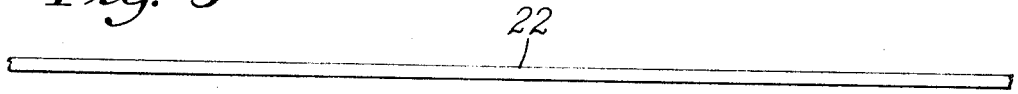
FIG. 5 is a side elevation of a portion of a length of getter wire according to the invention, in any one of the forms illustrated in FIGS. 2–4 inclusive or otherwise having, per linear measurement unit, a ratio of approximately 30 parts by weight of nickel and about 70 parts by weight of aluminum.

FIG. 5 illustrates a portion of a length of austenitic engendering getter wire, generally designated 22, which may be provided in alternate composite forms next to be described for enabling individual slugs 24 (FIGS. 1, 7–9) or fluxing material to be produced therefrom. As shown in FIG. 2, for instance, a getter wire may include a length of aluminum tubig 26, preferably of 1100 aluminum, packed with a compact powder mixture 28 including 1100 aluminum particles and nickel particles, the aluminum being about on the order of 66 parts by weight and the nickel being about on the order of 34 parts by weight. A particular example of the getter wire assembly indicated in FIG. 2 and the slugs of fluxing material severable therefrom may, by way of one illustration and for a ½ inch diameter stud, have the outside diameter of its 1100 aluminum wire about 0.093 inches and a wall thickness with a minimum of about 0.005 inches to a maximum of about 0.02 inches. The powder particle size for both the nickel and the alumunim may be in the range of about −170 +325 with 5 percent tolerance, for instance. Alternatively the wire tubing 26 may contain, in lieu of the mixture 28, nickel plated particles of aluminum.

Figure 3:
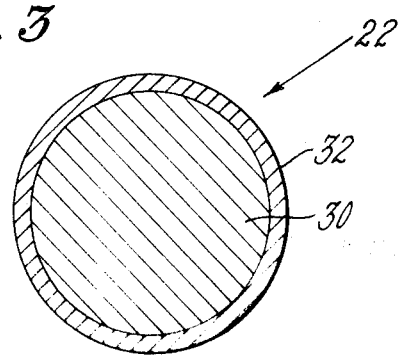
FIG. 3 is a magnified transverse section of another form of nickel and aluminum getter wire wherein the exterior is a nickel coating over an aluminum core.

A second alternate getter wire assembly is indicated in FIG. 3. It has an aluminum wire 30, preferably of 1100 aluminum, and a plated nickel skin 32. In this example, the composite wire has about 70 parts by weight of aluminum and 30 parts by weight of nickel. A preferred outside diameter is about 0.093 inches for use in a ½ inch diameter stud.

Figure 4:
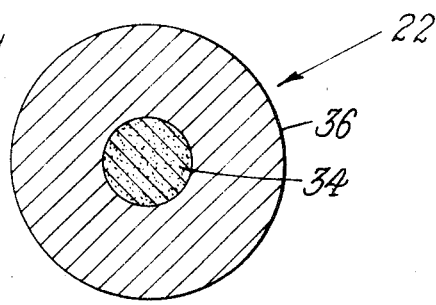
FIG. 4 is a magnified transverse section of a third alternative form of nickel and aluminum getter wire wherein a cored 1100 aluminum wire has a center core of nickel.

A third alternate getter wire assembly is shown in FIG. 4 wherein a central core 34 of nickel powder is about 30 parts by weight, and an outer or cored wire portion 36 is about 70 parts by weight of 1100 aluminum. Again, for a ½ inch diameter stud a preferred outside diameter of the cored aluminum wire is about 0.093 inches, the powder particle size being on the order previously noted.

It is not intended to limit the present invention to the exemplary composite fluxing forms herein shown, either as to specific proportions of the metals or their particular configuration, it being recognized that various other forms and proportions of aluminum and nickel within the approximate plur or minus 10percent may exist and have advantages in particular arc welding or other types of welding application.

The austenitic-favoring or engendering wire 22 may be progressively processed and mounted in stud recesses 20 (FIG. 6) as will now be described with reference particularly to FIGS. 7–12. In FIG. 11 a portion of a fluxing material and stud assembling machine generally designated 40 is shown, a horizontal slide 42 (FIGS. 11–13) being reciprocably operable by a rod 42 and a cross bar 46 having connection to a suitable source of power not shown, for example a fluid pressure cylinder.

The slide 42 operates in spaced guide ways 48, 48 between a loading position shown in FIG. 11 and an unloading position shown in FIG. 13. The slide pivotally carries on a bridging crosspin 50 a two-part stud holder 52. One part of this holder is recessed as at 54 releasably to cradle a stud body 16 presented either manually or otherwise. Another part 56 of the holder is arranged to be yieldingly engaged by a spring-pressed plunger 58 nested in the slide 42. A cutter bar 60 having a slug receiving bore 62 (FIG. 11) is arranged to reciprocate in a path parallel and adjacent to that of the slide 42. The bar 60 advances from a retracted slug pick-up station coaxial with a feed die bore 64 in a block 66 (FIG. 11) and then to an advanced slug inserting station (FIGS. 7, 11 and 13) coaxial with an initially loaded stud 16 in the retracted slide 42 and a reciprocable ram 68 operable in a bore 70 of the block 66. A length of aluminum-nickel getter wire 42 is cyclically advanced in the bore 64 and into the cutter bore 62 when retracted to enable successive slugs 24 to be sheared and transferred thereby. The thickness of the cut-off blade 60 regulates slug length, the diameter of the getter wire 22 determining its other weight factor.

When the getter wire 26 includes a powder, it is preferable that the ram 68 has a reduced end 69 (FIG. 10) for recessing the powder in the slug relative to its exposed face or end. This packs the powder firmly and allows the end of the tubular wire to be fully closed to retain the powder in the assembled stud.

When the cutter bar 60 receives and shears off a slug 24 of the getter wire, the cutter bar advances to transfer the slug into coaxial relation with the recess 20 of a presented stud 14, in the position shown in FIGS. 7, 12. An adjustable back-up member 72 (FIG. 11) is transversely reciprocable between ways 74, 74 to engage an end of the stud while the ram 68 forces the slug 24 into the recess 20 as shown in FIG. 3. With the ram 68 and the back-up member 72 retracted, the slide 42 now advances to a coining station (FIGS. 8 and 13). Here the inserted slug 24 is engaged by a coining tool 74 slidable axially in a bore 76 of a block 78, the slug then being backed by a reciprocable anvil 80 operable by means not herein shown.

FIG. 9 illustrates how the coining tool 74 reforms the exposed end of the inserted slug 24 of the type shown in FIG. 2 from a cylindrical shape to one having a hemispherical end. Thus the aluminum tubing 26 is rounded inwardly and preferably fully closed to retain the aluminum-nickel powder mixture 28 which is forced to enter the void at the bottom of the recess 20. In a ½ inch diameter stud the protrusion of the mounted tip of the fluxing assembly preferably is on the order of about a radius of 0.05 inches. It is to be noted that the tool 74 also exerts axial pressure on the stud surface 18 about the rim 82 (FIG. 9) of the stud recess 20 forcing this rim into the aluminum tubing 26 and causing a portion of the tubing to be deformed into tight sealing relation over the mentioned rim. With the anvil 80 and the tool 74 not yet retracted from the assembled stud and fluxing slug, the slide 42 is retracted for reloading, the holder 52 thus being caused to pivot clockwise about the pin 50 as indicated by dash lines in FIG. 12, whereupon the anvil 80 and the tool 74 separate to release the completed stud assembly.

It will be appreciated from the foregoing that a steel stud is provided which is arc welded to a low or high carbon steel substrate, the joint thereby formed exhibiting improved strength by reason of its austenitic condition favored by the aluminum and nickel of its novel fluxing assembly. Moreover each of the alternative aluminum-nickel combinations may advantageously by similarly secured to stud bodies and the like, the proportions of a selected composite slug within the plus or minus 10 percent range of 30 percent nickel and 70 percent aluminum, by weight perhaps depending largely on the availability and relative economy of the aluminum and nickel employed.

Having thus described our invention what we claim as new and desire to secure by Letters Patent of the United States is:

1. For drawn-arc welding of low or high carbon steel studs to high-carbon steel and/or high-carbon steel studs to low-carbon steel, an arc weldable steel stud having secured in partly protruding relation on one end thereof a composite fluxing material consisting essentially of aluminum and nickel in proportions favoring an austenitic weldment of the stud wiht a steel substrate said proportions being roughly about 70 parts of aluminum by weight and roughly about 30 parts of nickel by weight.

2. A stud as set forth in claim 1 wherein the fluxing material includes an exterior tubing of 1100 aluminum, the diameter of the tubing being less than about 75 percent that of the stud.

3. A stud as set forth in cliam 2 wherein the fluxing material additionally includes a mixed powder of nickel and 1100 aluminum particles packed within the aluminum tubing.

4. A stud as set forth in claim 3 wherein the particle size is on the order of $-170 +325$, 5 percent tolerance.

5. A stud as set forth in claim 3 wherein the stud end receiving the composite fluxing material is conical and centrally recessed, and the material has its aluminum tubing at least partly formed as a hemispherical protruding end portion, a peripheral rim of the stud defining its recess being deformed inwardly to crimp the tubing in locked relation.

6. A stud as set forth in claim 1 wherein the fluxing material consists of nickel on the order of about 30 parts by weight and aluminum on the order of 70 parts, a portion of the aluminum being comprised of tubing having a diameter less than that of the stud, said aluminum tubing being packed with aluminum particles which are nickel plated.

* * * * *